Figure 1:
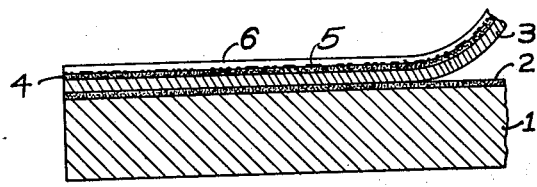

March 31, 1936.    T. S. REESE    2,035,760
DECORATIVE MATERIAL
Filed Sept. 17, 1934

INVENTOR.
Thomas S. Reese.
BY
Louis J. McBane.
ATTORNEY.

Patented Mar. 31, 1936

2,035,760

UNITED STATES PATENT OFFICE 2,035,760

DECORATIVE MATERIAL

Thomas S. Reese, Cleveland, Ohio

Application September 17, 1934, Serial No. 744,390

5 Claims. (Cl. 41—26)

This invention relates to a novel decorative sheet material of the inherently strong, wear resistant, pliable and formable type, and to structural materials involving the use thereof.

Various useful products have been made heretofore from materials of the leather imitation type, such as book bindings, cases of various kinds, and some articles of wearing apparel, and it has been the common practise to afford decorative effects largely in the same manner as in the case of genuine leather, by embossing, tooling, and rubbing with oils. Some solid colors have been imparted to the materials of this type by incorporating coloring ingredients in the material itself during the manufacture thereof, and there have been some instances of painting the surface of such materials. While such decorative effects have been useful for some applications, chiefly where the material is used as a substitute for a well established genuine leather use, the limitations of decorative effect have greatly confined the possible uses to which such material may be put to advantage.

It is an object of this invention to provide novel materials of the leather-like type which afford an endless variety of decorative effects. It is an object of this invention to provide novel decorative effects for leather-like materials. It is an object of this invention to provide novel materials of the leather-like type which have improved structural and physical properties. It is an object of this invention to provide a novel process for making such decorated materials.

Structural materials of the wall-board type require decoration for many uses. Some structural materials are flexible and formable, under heat and pressure, asphaltum board and chip board being of that type. Such materials are useful for interior paneling of automobiles where the panel frequently is shaped to conform to the contours of the body. Heretofore, it has been common to decorate such materials with cloth; latex paper being interposed between cloth and asphaltum board to prevent bleeding.

It is an object of this invention to provide a novel decorative medium for structural materials of the wall board type. It is an object of this invention to provide a novel decorative medium for formable and flexible structural materials. It is an object of this invention to provide a novel material of the asphaltum board type, and a process of making the same, which is less in cost, more durable, more readily cleaned and kept, more resistant to abuse, wear and weathering, and of greater life than materials heretofore available of that type.

Other objects and advantages of the present invention will appear in the following detailed description taken in connection with the accompanying drawing, in which, Figure 1 is a detail view, enlarged and in cross-section, illustrating the structure of the product of the invention.

Latex paper contains a considerable proportion of rubber introduced in the form of latex into the paper pulp during the beating process. The rubber imparts strength to the paper, makes it pliable and resistant to breaking and cracking by repeated bending and flexing, renders it formable, as by embossing and tooling without tearing or otherwise harming the paper. Latex paper may be stretched to a limited degree without weakening or breaking it or otherwise permanently harming it. The latex paper may be prepared in uniform thickness and with a smooth surface substantially free from rough and high spots by calendaring it, but the paper surface is an unattractive one unless suitably finished. Various prior art methods of finishing the surface decoratively are available but of limited decorative capacity and effect.

According to this invention, the latex paper is decorated by lithographing or printing, either relief printing or intaglio printing being useful for that purpose. The surface of the latex paper, even though calendared, is not adapted to afford good adhesion for a printed design and it is not of a color to serve as a background for a design. In order to prepare the surface of the latex paper for receiving a printed design it is coated with a surfacer which affords good adhesion for the print to the paper, which affords a standard background color which may be kept fixed and which may be chosen at will to suit the decorative figure, the background afforded by the surfacer providing depth and brilliance to the decoration. The surfacer also serves as a moisture proofing thus adding to the moisture resistant qualities of the latex paper. The surfacer may be applied as such directly to the latex paper, or a primer may be applied to the paper and a surfacer applied over it, or a primer-surfacer, a combination of priming and surfacing compositions may be used. In the following description, and in the claims, all of the foregoing alternatives will be referred to as a "surfacer".

The surfacer should be flexible so that the latex paper may be flexed, stretched, and deformed, as by embossing, without rupture of the surfacer film or the bond between the surfacer and the latex paper. While the surfacer may be of conventional composition, adapted to that purpose, it is desirable to provide a surfacer composition containing a considerable percentage of pyroxylin or other cellulose derivative, to afford strength for the film and for a reason to be made clear in the subsequent description. A suitable composition of surfacer, containing pyroxylin, for practising this invention is as follows:

|  | Pounds |
|---|---|
| RS ½° nitrocellulose | 10 |
| Blown castor oil | 5 |
| Dibutyl phthalate | 5 |
| Dammar gum | 3 |
| Titanium dioxide | 20 |
| Ethyl acetate | 10 |
| Butyl acetate | 10 |
| Butyl alcohol | 5 |
| Toluol | 25 |

The surfacer may be applied to the latex paper in any suitable manner as by spreading or spraying and dried or otherwise treated to set the composition into hardened film form. The surfacer may then be sanded or calendared, if desired, to remove rough and high spots preparatory to printing or lithographing the design thereon.

According to this invention, the decorative effect is formed as a print in situ, by printing or lithographing on the surfacer. In making the print any suitable ink known to the trade may be employed. However, it is desirable to employ a pyroxylin containing ink, or other cellulose derivative ink, so that the solvent of the ink will act to merge the pyroxylin of the ink with the pyroxylin of the surfacer. While relief printing may be employed for practising this invention, it is desirable to use intaglio printing and an intaglio printing ink, containing pyroxylin, suitable for practising this invention is as follows:

|  | Parts by weight |
|---|---|
| R. S. ¼° nitrocellulose | 2.00 |
| Blown castor oil | 2.00 |
| Dibutyl phthalate | 2.00 |
| Ester gum | 3.00 |
| Ethyl lactate | 10.00 |
| Xylol | 14.00 |
| Toluidine toner | 3.25 |
| Talc | 1.50 |

Intaglio printing may be employed not only for making the printed design but also to lay down the surfacer on the latex paper as a continuous film as disclosed and claimed in my copending application Serial No. 704,323 filed December 28, 1933, in which case the surfacer composition will be similar to the ink formula given above. Also any finish coat to be applied over the printed design may be laid down by intaglio printing according to the same process. In making the decorative finish for the latex paper in this manner the process is greatly speeded up due to the circumstance that the process of so decorating involves only passing the latex paper through printing presses at high speed and in rapid sequence, no change over from one type of equipment to another, such as from a coating machine to a printing press and back again, being necessary. Thus much time is saved and a great deal of equipment is rendered unnecessary, both of which factors materially reduce the cost of decorating the latex paper.

The print formed to create the design may be unlimited in variety as to the nature of the design and to the colors employed. It is practicable to employ one, two, three or four color printing in practising this invention. The decorative effects obtained, especially when using the process of my aforesaid copending application, are of the highest quality. Moreover, by using pyroxylin containing materials a very durable surface finish is obtained which resists wear, weathering, moisture, weak reagents, adds considerably to the strength of the product, thereby increasing the life of the resulting product. The printed design may be coated over by a clear finish which may be clear lacquer, varnish, synthetic resin, applied in any suitable manner, which further adds to the protection afforded by the decoration and provides a surface which may be highly polished to enhance the decorative effect of the finish. Since an endless variety of decorative effects are made available by the practise of this invention the resulting product may be put to many uses to which the nature of the decorative finish makes the product appropriate according to well established tastes and customs.

The nature of the decorative effect and the variety of the decorative effects may be still further advanced, in accordance with the practise of this invention, by combining the practise of embossing, or other forming of the latex paper, with printed effects. Embossed latex paper has been used heretofore but the decorative effect attained has been limited to relief effects so obtained. Such prior art practises greatly limit the usefulness of embossing to obtain decorative effects and materials in imitation of leather form substantially the only extensive use of such practise. Many attempts have been made to imitate other materials, such as cloth, by embossing the latex paper but they all fail in the color effects obtained. When it is desired to imitate decorative effects such as cloth, reptile skins, and the like, where shade and shadow and where variegated color occurs in definite relation to the relief contours of the decorative surface, it is not enough to reproduce either the color effect alone or the relief contours alone for either of such effects are obviously lacking in the characteristic qualities of the effect being reproduced so that they are ugly and inferior at first glance. According to this invention, decorative effects are produced by printing a shade and shadow effect or a variegated color effect and the material then is embossed to produce the relief contours characteristic of the surface being reproduced. The embossing is registered with the print so that the shade and shadow and variegated colors are in proper relation to the relief contours. By so practising this invention it is possible to produce cloth imitations, using latex paper finished as described, which, to the eye, can scarcely be distinguished from genuine cloth. Obviously this technique may be extended to many other decorative effects of which cloth and reptile skins are but two examples. The coat of clear finish may be applied over the print either before or after embossing.

This invention has been described as involving a printed design formed in situ, and while the design may be formed in other ways, by the use of a decalcomania transfer, for example, the print in situ has many advantages. It is as nearly perfect as it is possible to attain by printing or lithographing, not being marred by picking and tearing of the ink which frequently occurs in transferring the decalcomania transfer.

By forming the print in situ, that is, directly on the material to be used permanently as a part of the structure being decorated, all of the qualities inherent in the material by virtue of which it is desirable are made use of while economy of manufacture and better execution of the design are effected since neither non-essential materials nor non-essential operations intervene in the formation of the print in situ.

The decorated latex paper so produced is a product which may be stored, shipped, sold in commerce, and put into use in a variety of ways. It is a strong flexible, formable, durable, inexpensive material which affords a highly decorative surface, which is infinite in variety, durable, capable of taking a high polish, and is flexible and formable with the paper without injury to the substance or decorative effect thereof. It may be used per se as a book binding, for cases and other containers, for clothing and shoes. Or, it may serve as the decorative medium for other materials such as structural materials, for table tops and other furniture, as wall paper.

Asphaltum board is a sheet material composed of fibre and asphalt homogeneously mixed and compressed together to form a strong dense material which has adequate stiffness and rigidity to serve as a structural material for many uses. It is a board like material which may be formed by the application of heat and pressure and which will retain the shape imparted to it thereafter. This latter characteristic makes asphaltum board unique among materials of the wall board type and the present invention is concerned with asphaltum board and other sheet materials having characteristics similar thereto, such as chipboard.

Asphaltum board has a surface lacking in decorative value and it has been impractical, heretofore, to apply a decorative medium directly to the surface because of the tendency of the asphalt to bleed through and spoil the decoration. Asphaltum board, chip board, and the like, finds use primarily where its capacity to form under heat and pressure may be used. For that reason it is desirable that the decoration applied to it be equally capable of withstanding forming without deleterious effects.

It has been found that latex paper effectively resists bleeding, and according to this invention, the product made, as described heretofore, by creating a decoration on the surface of latex paper, is employed to decorate asphaltum board, chip board, and the like. The decorated latex paper is an ideal decorative medium for such structural materials for it combines the requisite flexibility and formability with the capacity to resist bleeding of the asphalt while affording beautiful decorative effects which are endless in variety, durable, easily cleaned and kept, well adapted for automobile interiors and capable of reproducing cloth and like effects.

The decorated latex paper is mounted on the asphaltum board, chip board, and the like, in sheet form by interposing an adhesive therebetween which may be an animal or vegetable glue, or casein or latex cement, for example. The ensemble is pressed to insure good adhesion, it being suitable to pass the board with the latex paper thereon between presser rollers which smooth out the paper, insure good contact with the board, and afford the necessary pressure for good adhesion. Clear finish may be applied over the decoration at this time if desired and it may be polished. The product so made may be stored, shipped, sold in commerce, and put to many uses. The product is a strong, dense, substantial, pliable and inexpensive structural material which may be handled and applied as wall board is applied, and which affords a beautiful, durable, easily cleaned, pliable and formable decorative surface.

The ensemble, consisting of the board with the decorated latex paper united therewith, may be formed to various desired shapes by arranging the ensemble in a die and applying pressure, the die imparting the desired shape to the board. The ensemble should be warm during forming and the die may be heated for that purpose. The chip board may be steamed. The ensemble may be heated prior to arranging it in the die. The ensemble may be cut to size and outline either before, after, or during the forming operation, and suitable cutting dies may be employed for that purpose. The resulting product may be mounted in place for use in the same manner as wall board.

In some cases the extent to which asphaltum board is to be formed is so great that it is difficult to maintain satisfactory adhesion between the latex paper and the asphaltum board during the forming process, effects resulting which destroy the decorative value of the product. According to this invention, the asphaltum board may be formed preliminary to mounting the latex paper in decorated form thereon. Then the latex paper may be adhesively united to the formed board along certain areas, at the margins for example, with adhesive on one or the other of the surfaces throughout the whole area thereof. Then the ensemble is arranged in the press again and the latex paper formed into conformity with the formed asphaltum board by operation of the press, the adhesive uniting the latex paper and the asphaltum board when the surfaces are brought together to form a secure union unmarred by the forming process.

As shown in the drawing, the board 1 has a coat of adhesive 2 thereon, which serves to unite the board with the latex paper 3. The latex paper bears the surfacer 4 and a print 5 thereon. One or more coats of clear finish 6 may be carried by the latex paper at the time it is being applied or the lacquer may be added after application of the latex paper to the board. The decorative medium is illustrated as being rolled onto the board.

Throughout the description of this invention, latex paper has been referred to repeatedly. While latex paper is an excellent medium for practising this invention, the invention is not limited thereto. The properties of latex paper as explained herein and as known to those skilled in the art, for the purposes of this invention, serve as a standard of comparison for determining substitute and equivalent materials, under the doctrine of equivalents, all of which may be used in practising this invention and the term latex paper is used in the claims with that intent. Likewise, asphaltum board is but a typical structural material in place of which others may be used in practising this invention, all of which alternates are intended to be included within the scope of this invention as defined by claims wherein the term asphaltum board appears.

While the invention has been described in detail by way of illustration it is not intended so to limit the invention inasmuch as variations in the details thereof may be made, as will be apparent to one skilled in the art, without departing from the spirit and scope of the invention as defined in the following claims.

What I claim as my invention is as follows:

1. An article of manufacture comprising wall board formable under heat and pressure, latex paper adhesively united to a surface of the wall board, a surfacer on the latex paper, a print in situ on the surfacer.

2. An article of manufacture comprising wall board formable under heat and pressure, latex paper adhesively united to a surface of the wall board, a surfacer on the latex paper, a print in situ on the surfacer, the ensemble having a formed and died-out shape.

3. An article of manufacture comprising asphaltum board, latex paper adhesively united to a surface of the board, a surfacer on the latex paper, a print in situ on the surfacer, the ensemble being formable under heat and pressure.

4. An article of manufacture comprising asphaltum board, latex paper adhesively united to a surface of the board, a surfacer on the latex paper, a print in situ on the surfacer, a film of clear finish over the print, the ensemble being formable under heat and pressure.

5. An article of manufacture comprising wall board, latex paper adhesively united with the wall board, a surfacer on the paper, a printed half-tone designed on the surfacer, an embossed design of cloth or the like imparted to the paper, the printed and embossed designs being in register.

THOMAS S. REESE.